United States Patent [19]

Kersham et al.

[11] 3,879,436

[45] Apr. 22, 1975

[54] TREATMENT OF ADIPONITRILE

[75] Inventors: Bernard John Kersham; Maurice George Pounder, both of Kingston, Ontario, Canada

[73] Assignee: Du Pont of Canada Limited, Montreal, Quebec, Canada

[22] Filed: Mar. 13, 1974

[21] Appl. No.: 450,575

[30] Foreign Application Priority Data

Mar. 29, 1973 Canada.............................. 167526

[52] U.S. Cl........ 260/465.8 R; 260/464; 260/465.2; 260/465.4
[51] Int. Cl........................................... C07c 121/26
[58] Field of Search.................... 260/465.2, 465.8 R

[56] References Cited
UNITED STATES PATENTS 3,325,532   6/1967   Rushton et al............... 260/465.8 X
3,350,281   10/1967  Romani et al. .............. 260/465.8 X
3,360,541   12/1967  Korchinsky et al............. 260/465.2

FOREIGN PATENTS OR APPLICATIONS 796,343   10/1968   Canada....................... 260/465.8 R Primary Examiner—Joseph Paul Brust

[57] ABSTRACT

A process for the removal of 2-cyanocylopentylideneimine and adipimide from crude adiponitrile synthesized from ammonia and adipic acid and comprising the steps of (a) treating the crude adiponitrile with an aqueous solution comprising about 0.02 to about 0.90%, by weight based on the total amount of water present of ammonia, at a temperature in the range 50° to 210°C., the aqueous solution having sufficient ammonia to treat at least about 20% of the adipimide in the crude adiponitrile, and (b) separating the treated adipnitrile. A preferred method for the separation of the treated adiponitrile from the aqueous layer is by the use of a decanting process.

11 Claims, No Drawings

3,879,436

TREATMENT OF ADIPONITRILE

BACKGROUND OF THE INVENTION

1. Field of the Invention

The present invention relates to a process for the treatment of adiponitrile and in particular to the treatment of adiponitrile manufactured from adipic acid by the so-called "liquid-phase" process

2. Description of the Prior Art

Adiponitrile may be manufactured in a number of ways. One such way is using the so-called "liquid-phase" process, an embodiment of which is disclosed in U.S. Pat. No. 2,273,633 which issued to M. L. A. Fluchaire et al. on Feb. 17, 1942. According to this process, molten adipic acid in the presence of a catalyst is agitated and reacted with ammonia at temperatures usually varying between about 250° to 350°C.

The "liquid-phase" process yields a crude product of adiponitrile containing impurities of 2-cyanocyclopentylideneimine, adipimide, succinimide and/or glutarimide. Some of the impurities, for example 2-cyanocyclopentylideneimine, boil at temperatures close to the boiling point of adiponitrile. Such close boiling impurities cannot be removed efficiently in industrial scale distillation columns, and alternate chemical purification techniques are expensive. These impurities in the adiponitrile may lead to impurities in subsequent derivatives, in particular in hexamethylene diamine, that are difficult to remove. Failure to remove these latter impurities from hexamethylene diamine results in inferior and variable product properties, especially of the derived polymers such as, for example, nylon.

Impurities such as adipimide are capable of being converted to adiponitrile. Removal of adipimide from crude adiponitrile and subsequent conversion to adiponitrile may be an important factor in the economics of a process for the manufacture of adiponitrile. Impurities such as succinimide and glutarimide may be treated to aid in the separation thereof from adiponitrile.

Techniques for the treatment of adiponitrile, especially adiponitrile containing 2-cyanocyclopentylideneimine, are known. In particular, Kershaw and Pounder in Canadian Patent 796,343, which issued Oct. 8, 1968, describe a process in which contaminated aliphatic organic dinitrile is heated to an elevated temperature substantially in the absence of additives, and maintained at the elevated temperature until substantially no further ammonia is evolved. The treatment of adiponitrile with a solid acid catalyst is disclosed by Kershaw in Canadian Patent 912,036, issued Oct. 10, 1972. Such processes may be capable of improvement, especially with regard to the treatment of adipimide in crude adiponitrile.

SUMMARY OF THE INVENTION

A process has now been found for the simultaneous removal of 2-cyanocyclopentylideneimine and adipimide in crude adiponitrile.

Accordingly, the present invention provides a process for the removal of 2-cyanocyclopentylideneimine and adipimide by treatment of crude adiponitrile synthesized from ammonia and adipic acid, said adiponitrile comprising 2-cyanocyclopentylideneimine and adipimide, succinimide and/or glutarimide, comprising the steps of (a) treating the crude adiponitrile with an aqueous solution comprising about 0.02 to about 0.90%, by weight of ammonia based on the total amount of water present, at a temperature in the range 50 to 210°C., said aqueous solution having sufficient ammonia to treat at least about 20% of the adipimide in the crude adiponitrile, and (b) separating the adiponitrile so treated.

In a preferred embodiment of the process of the present invention, the temperature is in the range 130°–190°C.

In a liquid-phase process for the manufacture of adiponitrile, a fraction substantially comprised of adiponitrile may be separated from the reaction mixture. This fraction is herein referred to as crude adiponitrile. Typical impurities in crude adiponitrile include 2-cyanocyclopentylideneimine, adipimide, succinimide, glutarimide, Δ-cyanovaleramide and Δ-cyanovaleric acid.

In the process of te present invention, crude adiponitrile is contacted with an aqueous solution of ammonia. This solution of ammonia may be a freshly prepared solution obtained, for example, by contacting ammonia with water. The ammonia solution may also be obtained from other sources, for example from another process and, in particular, from a liquid-phase process for the manufacture of adiponitrile. If this latter process is operated continuously, a continuous stream of aqueous ammonia may be obtained as a separate fraction from the apparatus used for use in the process for separation of the crude adiponitrile. The aqueous solution of ammonia should be substantially free from impurities, especially impurities that may be difficult to separate from adiponitrile or derived compounds, or impurities that may result in compounds that are difficult to so separate or that may otherwise adversely affect the treatment of the crude adiponitrile. Techniques for the control of the level of ammonia in the adiponitrile being treated are known.

The amount of water present in the adiponitrile during treatment by the process of the invention is not critical although in order that effective treatment may be attained, the amount of water should be at least the stoichiometric amount necessary to hydrolyze any hydrolyzable impurities. Preferred amounts of water are such that the ratio of adiponitrile to water is in the range about 20:1 to 0.5:1 by weight and especially in the range 5:1 to 0.5:1.

The amount of ammonia in the adiponitrile during treatment should be not more than about 0.90% by weight based on the total amount of water present. This upper limit is determined primarily by the economics of the process. The lower limit of the ammonia concentration may depend on the impurities in the crude adiponitrile. For example, crude adiponitrile manufactured by a liquid-phase process contains organic acidic impurities, a typical example being Δ-cyanovaleric acid. The level of such impurities in the crude adiponitrile may vary and may depend on the operation of the process for the manufacture of adiponitrile, it being possible to vary the level of, for example, Δ-cyanovaleric acid by the method of removal of the crude adiponitrile. The crude adiponitrile may conveniently contain about 1% Δ-cyanovaleric acid, but substantially higher or lower levels of Δ-cyanovaleric acid may be present. The level of ammonia required for a desired degree of treatment of the adiponitrile depends on the level of acidic impurities in the adiponitrile.

Suitable temperatures for the process of the present invention may range between temperatures at which adiponitrile hydrolysis and/or degradation may be significant and the temperatures at which the rate of treatment may not be economic. Suitable temperatures may be in the range about 50° to 210°C. and in particular in the range 130° to 190°C.

The process may be operated at any convenient pressure, for example, at 1 to 7 atmospheres. The pressure, however, is governed largely by the temperature at which the crude adiponitrile is treated.

The process of the invention may be operated as a batch process or, preferably, as a continuous process.

The removal of 2-cyanocyclopentylideneimine from crude adiponitrile is favored by the absence of ammonia while the removal of adipimide is favored by the presence of ammonia. It is preferred that the level of ammonia be selected so that at least 20% by weight of each of 2-cyanocyclopentylideneimine and adipimide are removed from the crude adiponitrile. It is especially preferred that the ammonia level be selected so that at least 50% of each of these impurities be removed. Generally the ammonia level may vary from about 0.01 to 0.09% by weight based on the total amount of water. It is preferred that the level of ammonia be in the range of about 0.02 to 0.90%, by weight based on the total amount of water present, and most preferred in the range about 0.03 to 0.30%.

Techniques for the separation of adiponitrile after treatment are known. A preferred technique is by the use of a decanting process. In the decanting process the adiponitrile be decanted from the aqueous phase. Such a process results in a further reduction in the level of imides in the treated adiponitrile especially of succinimide and glutarimide. The imides, e.g. succinimide and glutarimide, are at least partly soluble in both water and adiponitrile and thus in the decanting process the imides will be distributed between the two layers. Thus the imides in the adiponitrile are further reduced. Adipimide separated from the adiponitrile may be recycled to the process for the preparation of adiponitrile.

The process of the present invention results in the conversion of adipimide in the adiponitrile into a mixture of adipamide and adipamic acid. It is believed that the adipimide is converted primarily into adipamic acid at low levels of ammonia and into a mixture of adipamide and adipamic acid at higher levels of ammonia. Adipamic acid may be the preferred product as the ammonium salt of adipamic acid is more soluble in water than adipamide and the adipamic acid may be separated, as the ammonium salt, from adiponitrile in a decanting process. For this reason in the process of the present invention the adiponitrile separation after treatment with aqueous ammonia solution is preferably by decantation. The decanting step is preferably operated with the aqueous phase being slightly alkaline, e.g. a pH of about 7.5–8.5. Adipamide formed in the treatment process may precipitate from the treatment mixture and it may be necessary to remove the adipamide by techniques other than decanting e.g. by filtration. It may therefore be preferred to treat the crude adiponitrile according to the process of the present invention using an ammonia level of less than 0.30%, by weight based on the total amount of the water present to avoid said precipitation.

The following examples serve to further illustrate the process of the present invention.

EXAMPLES 1–8

In a laboratory scale apparatus adapted for the continuous treatment of crude adiponitrile by the process of the invention, crude adiponitrile obtained from a liquid-phase process for the manufacture of adiponitrile from adipic acid was mixed with an aqueous solution of ammonia and fed to the upper end of an ammonia stripping column. The lower end of the ammonia stripping column was connected to a reactor from which the treated mixture of adiponitrile and aqueous ammonia, herein referred to as reactor tails, was continuously removed. The holdup time of the adiponitrile in the reactor was estimated as being about 30 minutes. The ammonia stripping column was operated so as to reduce the level of ammonia in the crude adiponitrile/aqueous ammonia feed to the level desired in the reactor. Volatile matter was removed from the upper end of the ammonia stripping column.

Further details of the experimental conditions, together with the results obtained are given in Table I. The crude adiponitrile contained approximately 1.0% Δ-cyanovaleric acid and 0.66% Δ-cyanovaleramide.

TABLE I

| Example | | 1 | 2 | 3 | 4 | 5 | 6 | 7 | 8+ |
|---|---|---|---|---|---|---|---|---|---|
| Crude Adiponitrile (ml/hr) | | 230 | 240 | 255 | 255 | 250 | 300 | 95***** | 250 |
| Aqueous ammonia (5% w/v, ml/hr) | | 255 | 255 | 250 | 255 | (250)*** | 300**** | 85 | 250 |
| Reactor level (ml) | | 250 | 250 | 250 | 250 | 250 | 900 | 250 | 125 |
| Reactor pressure (psig) | | 52 | 56 | 52 | 52 | 50 | 45 | 55 | 94 |
| Reactor Temperature (°C.) | | 150 | 150 | 150 | 150 | 150 | 145 | 150 | 170 |
| Distillate*(as % of aqueous ammonia solution) | | 8.8 | 4.3 | 20.5 | 6.1 | 8.0 | 0 | 18.8 | 0 |
| Ammonia in reactor tails** (as % w/v) | | 0.116 | 1.22 | 0.084 | 0.254 | 0.054 | NA | 0.26 | 0.035 |
| 2-Cyanocyclopen- tylideneimine | — before | 0.32 | 0.32 | 0.32 | 0.32 | 0.32 | 0.32 | 0.32 | 0.46 |
| | — after | 0.06 | 0.27 | 0.04 | 0.15 | 0.03 | 0.05 | 0.14 | 0.042 |
| Adipimide | — before | 0.60 | 0.60 | 0.60 | 0.60 | 0.60 | 0.63 | 0.61 | 0.66 |
| | — after | 0.04 | 0.01 | 0.10 | 0.01 | 0.33 | 0.11 | 0.06 | 0.015 |

TABLE I—Continued

| Example | | 1 | 2 | 3 | 4 | 5 | 6 | 7 | 8+ |
|---|---|---|---|---|---|---|---|---|---|
| Succinimide/Glut-arimide | — before | 0.77 | 0.77 | 0.77 | 0.77 | 0.77 | 0.69 | 0.67 | NA |
| | — after | 0.40 | 0.11 | 0.70 | 0.42 | 0.72 | 0.50 | 0.32 | NA |
| Adipamic acid | — before | 0.0 | NA | NA | NA | NA | 0.0 | 0.0 | NA |
| | — after | 0.25 | NA | NA | NA | NA | 0.60 | 0.66 | NA |
| Adipamide | — before | 0.0 | NA | NA | NA | NA | 0.0 | 0.0 | NA |
| | — after | 0.34 | NA | NA | NA | NA | 0.0 | 0.0 | NA |

* mostly water
** expressed as percentage of water
*** water only, i.e. no ammonia in feed
**** as 0.25% w/v aqueous ammonia, level in reactor tails not measured
***** fed directly to reactor ie not through stripping column. Compare results with those of Example 1. The latter are believed to show the effect of the concentration of ammonia in the stripping column.
NA not available
+ contained 1.02% Δ-cyanovaleramide, 1.0% Δ-cyanovaleric acid. Aqueous ammonia was 0.1% w/v.
w/v weight to volume

EXAMPLE 9

To 100 ml. of crude adiponitrile manufactured in a liquid-phase process and having the following impurities content:

0.32% 2-cyanocyclopentylideneimine
0.60% adipimide
0.66% Δ-cyanovaleramide
1.0% Δ-cyanovaleric acid
0.77% succinimide/glutarimide was added 100 ml. of water and the resultant mixture was refluxed under atmospheric pressure. After one hour, a sample of the refluxing mixture analyzed by gas chromatography as follows:

0.014% 2-cyanocyclopentylideneimine
0.60% adipimide

To the mixture was added 1.5 ml. of 28% w/v of ammonium hydroxide. After refluxing for a further 45 minutes, the mixture analyzed as follows:

0.068% 2-cyanocyclopentylideneimine
0.18% adipimide thereby demonstrating the importance of the presence of ammonia in the treatment of adipimide and the effect of ammonia on the treatment of 2-cyanocyclopentylideneimine.

EXAMPLE 10

The use of a decanting process for the separation of treated adiponitrile from the treatment mixture was illustrated using the reactor tails of Examples 1, 3 and 4. The pH of the reactor tails was adjusted to 8 using aqueous ammonia, to aid in the separation of acidic compounds, and the temperature of the reactor tails was reduced to about 25°–30°C. The adiponitrile layer was separated by decantation and analyzed. The results, given in Table II, show the reduction in the level of adipimide, and especially of succinimide and glutarimide, in treated adiponitrile separated by a decanting process.

Table II

| Example | 1 | 3 | 4 |
|---|---|---|---|
| Imide Concentration* | | | |
| (a) Reactor Tails | | | |
| Adipimide | 0.04 | 0.10 | 0.01 |
| Succinimide/Glutarimide | 0.40 | 0.70 | 0.42 |
| (b) After Decanting | | | |
| Adipimide | 0.026 | 0.070 | 0.007 |
| Succinimide/Glutarimide | 0.16 | 0.29 | 0.17 |

*expressed as percentage of adiponitrile

The foregoing detailed description has been given for clarity of understanding and no unnecessary limitations are to be understood therefrom. The invention is not limited to exact details shown and described for obvious modifications will occur to one skilled in the art.

What is claimed is:

1. A process for the simultaneous removal of 2-cyanocyclopentylideneimine and adipimide by treatment of crude adiponitrile synthesized from ammonia and adipic acid, said adiponitrile comprising 2-cyanocyclopentylideneimine and adipimide, succinimide and/or glutarimides, comprising the steps of (a) treating the crude adiponitrile with an aqueous solution comprising about 0.02 to about 0.90%, by weight of ammonia based on the total amount of water present, at a temperature in the range 50° to 210°C., said aqueous solution having sufficient ammonia to treat at least about 20% of the adipimide in the crude adiponitrile, and (b) separating the adiponitrile so treated.

2. The process of claim 1 in which the ratio of adiponitrile to water in the adiponitrile being treated is in the range about 20:1 to 0.5:1.

3. The process of claim 2 in which the temperature is in the range 130° to 190°C.

4. The process of claim 3 in which the ratio of adiponitrile to water in the adiponitrile being treated is in the range about 5:1 to 0.5:1.

5. The process of claim 4 in which at least 50% of the 2-cyanocyclopentylideneimine and at least 50% of the adipimide in the adiponitrile being treated are hydrolyzed.

6. The process of claim 1 in which the pressure is in the range 1 to 12 atmospheres.

7. The process of claim 5 in which the aqueous solution contains 0.03 to 0.30%, by weight based on the total amount of water present, of ammonia.

8. The process of claim 3 in which the adiponitrile contains at least one of the compounds selected from the group consisting of succinimide and glutarimide.

9. The process of claim 7 in which the product of the treatment of adipimide is substantially adipamic acid.

10. The process of claim 1 wherein the separation of adiponitrile from the aqueous treating solution comprises a decanting process.

11. The process of claim 10 wherein the aqueous treating solution in the decanting process has a pH of 7.5–8.5.

* * * * *

UNITED STATES PATENT OFFICE
CERTIFICATE OF CORRECTION

PATENT NO. : 3,879,436
DATED : Apr. 22, 1975
INVENTOR(S) : Bernard John Kershaw, Maurice George Pounder It is certified that error appears in the above-identified patent and that said Letters Patent are hereby corrected as shown below:

The first inventor's name has been misspelled. It should read --Kershaw-- instead of "Kersham".

Signed and Sealed this fourteenth Day of October 1975

[SEAL]

Attest:

RUTH C. MASON
Attesting Officer

C. MARSHALL DANN
Commissioner of Patents and Trademarks